United States Patent [19]

Moore et al.

[11] 3,919,354

[45] Nov. 11, 1975

[54] IMPACT RESISTANT POLYMERS OF A RESINOUS COPOLYMER OF AN ALKENYL AROMATIC MONOMER AND UNSATURATED DICARBOXYLIC ANHYDRIDE

[75] Inventors: Eugene R. Moore; Ronald G. Lehrer; Charles E. Lyons; Leland Dennis McKeever, all of Midland, Mich.

[73] Assignee: The Dow Chemical Company, Midland, Mich.

[22] Filed: May 17, 1974

[21] Appl. No.: 471,087

Related U.S. Application Data

[63] Continuation of Ser. No. 287,526, Sept. 8, 1972, abandoned, which is a continuation-in-part of Ser. No. 182,893, Sept. 22, 1971, abandoned.

[52] U.S. Cl. .................... 260/880 R; 260/880 B

[51] Int. Cl.² ........................................ C08L 9/06
[58] Field of Search .............................. 260/880 R

[56] References Cited
UNITED STATES PATENTS

| | | | |
|---|---|---|---|
| 2,914,505 | 11/1959 | Roper | 260/880 R |
| 3,322,853 | 5/1967 | Trementozzi | 260/880 R |
| 3,642,949 | 2/1972 | Stafford | 260/880 R |
| 3,714,295 | 1/1973 | Nakayama | 260/880 R |
| 3,751,524 | 8/1973 | Haigh | 260/880 R |

*Primary Examiner*—Paul R. Michl
*Attorney, Agent, or Firm*—Robert B. Ingraham

[57] ABSTRACT

Impact resistant polymers of styrene/maleic anhydride and similar monomers are prepared by providing a solution of rubber in styrene, initiating polymerization and adding maleic anhydride.

22 Claims, No Drawings

IMPACT RESISTANT POLYMERS OF A RESINOUS COPOLYMER OF AN ALKENYL AROMATIC MONOMER AND UNSATURATED DICARBOXYLIC ANHYDRIDE

This Application is a Continuation application of our Co-pending application, Ser. No. 287,526, filed Sept. 8, 1972, now abandoned, which was a Continuation in part of our Co-pending application Ser. No. 182,893, filed Sept. 22, 1971, now abandoned.

Impact polystyrene is a highly desirable item of commerce and has found wide use. However, the resistance of such impact polystyrene to heat, particularly on long term exposure, limits many of its potential applications such as electronic housings and other applications where the material will be exposed to elevated temperatures for a substantial period of time. It is well known that a copolymer of styrene and maleic anhydride, and that polymers of alkenyl aromatic monomers and unsaturated dicarboxylic anhydride such as maleic anhydride, provide increased heat resistance when compared to the equivalent rubber reinforced styrene homopolymer. Generally the inculsion of a rubber reinforcing such as is set forth in U.S. Pat. No. 2,694,692 provides a composition of increased impact resistance and decreased heat distortion temperature. The greater the quantity of rubber added, the greater the loss in heat distortion. Numerous efforts have been made to prepare impact styrene/maleic anhydride polymers by various techniques such as solution blending of the styrene/maleic anhydride copolymer with rubber and by mechanical milling of the rubber and suitable polymer at a sufficient temperature to heat plastify the styrene/maleic anhydride resin. The results of such blending have not produced polymer compositions of the desired combination of physical properties, nor have efforts to prepare copolymers of styrene/maleic anhydride and butadiene. It is well recognized in the art that the copolymerization of styrene/maleic anhydride presents substantial difficulty insofar as the styrene and maleic anhydride has a very strong tendency to polymerize in approximately a 1:1 ratio, and only by employing special techniques can one obtain what might be considered as a random copolymer of styrene and maleic anhydride wherein the styrene constitutes a major mole proportion of the two monomers in the polymer. Such a process is set out in U.S. Pat. No. 2,971,939 issued to M. Baer Feb. 14, 1961. Generally in the various blending techniques it has been necessary to use a nitrile rubber rather than a diene or styrene/butadiene rubber in order to obtain a desirable rubber reinforced copolymer of styrene and maleic anhydride.

It would be desirable if there were available an improved alkenyl aromatic monomer-containing resin having improved heat distortion and incorporating an unsaturated dicarboxylic anhydride with a diene rubber.

It would also be desirable if there were available an improved method for the preparation of polymers of alkenyl aromatic monomers and unsaturated dicarboxylic anhydrides containing a reinforcing rubber.

It would further be desirable if there were available an improved styrene/maleic anhydride/diene rubber composition suitable for extrusion and molding having a high heat distortion temperature and desired impact resistance.

These benefits and other advantages in accordance with the present invention are achieved in a polymer suitable for molding and extrusion of substantially improved resistance to mechanical shock and impact, the polymer comprising the polymerization product of (a) a monovinyl alkenyl aromatic monomer containing up to 12 carbon atoms and having the alkenyl group attached directly to the benzene nucleus, the alkenyl aromatic compound being present in a proportion of from about 65 to 95 parts by weight and from 35 to 5 parts by weight of an unsaturated dicarboxylic anhydride readily copolymerizable therewith, and (b) from 5 to 35 parts by weight (and beneficially from 10 to 25 parts by weight) of a rubber per 100 parts of (a) plus (b), the rubber being in the form of a plurality of particles having diameters within the range of 0.02 to 30 microns (and beneficially from 0.1 to 10 microns) dispersed throughout a matrix of polymer of alkenyl aromatic monomer and the anhydride, at least a major portion of the rubber particles containing occlusions of the polymerization product of (a).

Also contemplated within the scope of the present invention is an improvement in a method for the preparation of an impact resistant polymer of an alkenyl aromatic monomer and an unsaturated dicarboxylic anhydride copolymerizable therewith, the polymer being suitable for molding and extrusion, the steps of the method comprising providing an alkenyl aromatic monomer having dissolved therein a rubber, agitating the monomer/rubber mixture and initiating free radical polymerization thereof, adding to the agitated mixture the unsaturated dicarboxylic anhydride at a rate substantially less than the rate of polymerization of the alkenyl aromatic resinous monomer, and polymerizing the alkenyl aromatic monomer and the unsaturated anhydride, the alkenyl aromatic monomer being employed in a proportion of from about 65 to 95 parts by weight, the unsaturated anhydride from about 35 to 5 parts by weight, and the rubber in a proportion of from about 5 to 35 parts per 100 parts, based on the combined weight of the alkenyl aromatic monomer, the anhydride and the rubber.

The present invention is particularly suited for the polymerization of alkenyl aromatic monomers. By the term "alkenyl aromatic monomer" is meant an alkenyl aromatic compound having the general formula

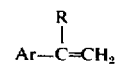

wherein Ar represents an aromatic hydrocarbon radical, or an aromatic halohydrocarbon radical of the benzene series, and R is hydrogen or the methyl radical and containing up to 12 carbon atoms. Examples of such alkenyl aromatic monomers are styrene, α-methylstyrene, o-methylstyrene, m-methylstyrene, p-methylstyrene, ar-ethylstyrene, ar-vinylxylene, ar-chlorostyrene or ar-bromostyrene and the like. Such polymerizations may be catalyzed or uncatalyzed and conducted under conventional temperatures and conditions and are readily controlled as to the particle size of the rubber in accordance with the present invention. Comonomers polymerizable with the alkenyl aromatic monomer and anhydride are methylmethacrylate, methylacrylate, ethylmethacrylate, ethylacrylate, acrylonitrile, methacrylonitrile and the like. Beneficially, such monomers are employed in a proportion of from about 10 to 40 weight percent of the anhydride/butadiene/styrene polymer composition, and advantageously from about 20 to 35 weight percent of the polymer composition.

Suitable copolymerizable unsaturated dicarboxylic anhydrides include maleic anhydride, chloromaleic anhydride, dichloromaleic anhydride, citraconic anhydride, itaconic anhydride, phenylmaleic anhydride, aconitic anhydride and mixtures thereof.

Suitable rubbers for the practice of the present invention are diene rubbers or mixtures of diene rubbers; i.e., any rubbery polymers (a polymer having a glass temperature not higher than 0°C., and preferably not higher than −20°C., as determined by ASTM Test D-746-52T) of one or more conjugated 1,3 dienes; e.g., butadiene, isoprene, piperylene, chloroprene, etc. Such rubbers include homopolymers, interpolymers and block copolymers of conjugated 1,3 dienes with up to an equal amount by weight of one or more copolymerizable monoethylenically unsaturated monomers, such as monovinylidene aromatic hydrocarbons (e.g., styrene; an aralkylstyrene, such as the o-, m- and p-methylstyrenes, 2,4-dimethylstyrene, the ar-ethylstyrenes, p-tert-butylstyrene, etc.; an α-alkylstyrene, such as α-methylstyrene, α-ethylstyrene, α-methyl-p-methylstyrene, etc.; vinyl naphthalene, etc.); ar-halo monovinylidene aromatic hydrocarbons (e.g., the o-, m- and p-chlorostyrenes, 2,4-di-bromostyrene, 2-methyl-4-chlorostyrene, etc.); acrylonitrile; methacrylonitrile; alkyl acrylates (e.g., methylacrylate, butyl acrylate, 2-ethylhexyl acrylate, etc.); the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); α-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2 percent of a cross-linking agent, based on the weight of the rubber-forming monomer or monomers, cross-linking may present problems in dissolving the rubber in the monomers for the graft polymerization reaction, particularly for a mass or bulk polymerization reaction. In addition, excessive cross-linking can result in loss of the rubbery characteristics. The cross-linking agent can be any of the agents conventionally employed for cross-linking diene rubbers; e.g., divinylbenzene, diallyl maleate, diallyl fumarate, diallyl adipate, allyl acrylate, allyl methacrylate, diacrylates and dimethacrylates of polyhydric alcohols; e.g., ethylene glycol dimethacrylate, etc.

A preferred group of rubbers are those consisting essentially of 65 to 100 percent by weight of butadiene and/or isoprene and up to 35 percent by weight of a monomer selected from the group consisting of alkenyl aromatic hydrocarbons (e.g., styrene) and unsaturated nitriles (e.g., acrylonitrile), or mixtures thereof. Particularly advantageous substrates are butadiene homopolymer or an interpolymer or A–B block copolymers of from 70 to 95 percent by weight butadiene and from 5 to 30 percent by weight of styrene.

The rubbers or rubbery reinforcing agents employed in the present invention must also meet the following requirements: an inherent viscosity from about 0.9 to 2.5 and preferably 0.9 to 1.7 grams per deciliter (as determined at 25°C. employing 0.3 grams of rubber per deciliter of toluene). Advantageously, the amount of such rubbery reinforcing agent can be from 5 to 35 weight percent of the final product, and beneficially from 10 to 25 percent, and most advantageously from 15 to 25 percent. If desired, a molecular weight regulator or chain transfer agent may be added after phase inversion in relatively small amounts, such as from about 0.001 to 1 percent by weight of the polymerizable monomers. Such chain transfer agents can conveniently be organic thiols such as butyl mercaptans, tertiary dodecyl mercaptans, lauryl mercaptans, stearyl mercaptans, benzoyl mercaptans, cyclohexylmercaptan; dithiols such as 1,6-hexanedithiol; halogenated hydrocarbons such as carbon tetrachloride, carbon tetrabromide; phosphines such as phenyl phosphine, ethyl phosphine, butyl phosphine, octyl phosphine; primary and secondary alkyl amines; primary and secondary aromatic amines; α-methylstyrene dimer; ferric chloride; carboxylic acid esters such as ethyl acetate, butyl stearate, ethyl benzoate, benzyl acetate, ethyl butyrate, and the like. Incorporation of the molecular weight regulator prior to phase inversion results in some physical properties in the polymer which are less desirable than polymers prepared in accordance with the present invention.

Preparation of polymers in accordance with the present invention is readily accomplished by the initiation of polymerization of the alkenyl aromatic monomer solution of the rubber by thermal or beneficially, free radical initiators. Once polymerization has been initiated, the unsaturated copolymerizable anhydride is then added to the polymerizing mixture in a continous or continual manner to maintain the concentration of the unsaturated anhydride at a relatively low level. Such processes for the copolymerization of styrene and maleic anhydride have been described at length in the literature, especially in U.S. Pat. Nos. 2,971,939 and 2,769,804, and beneficially as a solution as disclosed in U.S. Pat. No. 3,336,267. The teachings of these patents are herewith incorporated by reference thereto.

The copolymers useful in the present invention are non-equimolar random copolymers of the alkenyl aromatic monomer with a copolymerizable anhydride and are prepared typically employing the methods of the hereinbefore mentioned patents. For example, a polymer prepared from 75 mole percent styrene and 25 mole percent maleic anhydride by admixing the monomers with suitable diluent and catalyst, heating until polymerization is about complete will yield a polymer or polymer mixture which is not suitable for the practice of the present invention.

Polymerization of the polymerizable mixture may be accomplished by thermal polymerization generally between temperatures of 60°C. to 170°C. and preferably from 70°C. to 140°C., or alternately any free radical generating catalyst may be used in the practice of the invention, including actinic radiation. It is preferable to incorporate a suitable catalyst system for polymerizing the monomer, such as the conventional monomer-soluble peroxy and perazo compounds. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide, isopropyl carbonate, 2,5-dimethyl-2,5-di(tert-butylperoxy)-hexane, 2,5-dimethyl-2,5-di(tert-butylperoxy)hexyne-3, tert-butyl hydroperoxide, cumene hydroperoxide, p-methane hydroperoxide, cyclopentane hydroperoxide, diisopropylbenzene hydroperoxide, p-tert-butyl cumene hydroperoxide pinane hydroperoxide, 2,5-dimethylhexane-2,5-dihydroperoxide, 2,2'-azobisisobutyronitrile, etc., and mixtures thereof.

The catalyst is generally included within the range of 0.001 to 1.0 percent by weight, and preferably on the order of 0.005 to 0.5 percent by weight of the polymerizable material, depending upon the monomers and the desired polymerization cycle.

If desired, small amounts of antioxidants are included in the feed stream, such as alkylated phenols; e.g., 2,6-di-tert-butyl-p-cresol, phosphites such as trinonyl phenyl phosphite and mixtures containing tri(mono and dinonyl phenyl) phosphites. Such materials in general may be added at any stage during polymerization. Optionally, a wide variety of diluents may be employed in the reaction, generally such diluents being present at a level less than about 100 percent of the weight of the reaction mixture, and beneficially at about 5 to 50 parts by weight per 100 parts of polymerizable components. Such diluents may be liquid materials which are generally non-reactive under polymerization conditions and are a solvent for the polymer produced, as well as the monomer. Such diluents include dimethylformamide, acetone, methyl ethyl ketone, ethylbenzene, xylenes. Beneficially, plasticizers may be added to the feed stream or at any intermediate stage of the polymerization. Such plasticizers or lubricants include butyl stearate, butyl benzylphthalate, zinc stearate, mineral oil.

Polymers prepared in accordance with the present invention are eminently suited for extrusion into sheet or film. Such sheet is beneficially employed for thermoforming into containers, packages and the like; alternately, the polymer is employed with benefit for injection molding of a wide variety of components such as enclosures for electrical devices, containers, automotive components such as heater ducts and other shaped articles including those which it is desired to paint or coat, dinnerware, heatable frozen food containers and the like. Such articles are generally more chemically resistant than corresponding styrene polymers.

The invention is further illustrated but not limited by the following examples.

EXAMPLE 1

A resin pot fitted with an agitator, reflux condenser and dropping funnel is charged with 960 grams of styrene; 650 grams of methyl ethyl ketone and 175 grams of a rubber, the rubber being a styrene/butadiene block copolymer containing 15 weight percent styrene and 85 weight percent butadiene and being of the AB configuration and having an inherent viscosity of 1.1. The styrene/rubber mixture is heated to 85°C. with agitation and a solution of 290 grams of maleic anhydride; 296 grams of methyl ethyl ketone together with 1.8 grams of azo-bisisobutyronitrile is added to the dropping funnel. The maleic anhydride solution is added at a rate of 65 milliliters per hour for a period of 5 hours and then at a rate of 41 milliliters per hour for 4 hours and then at 16 milliliters per hour until completion of addition. Heating and agitation is continued for 2 hours after the maleic anhydride solution addition is completed. One hour after completion of the addition, 5.6 grams of 1,3,5-trimethyl-2,4,6-tris(3,5-di-tert-butyl-4-hydroxybenzol)benzene are added as an antioxidant. On completion, the contents of the resin pot are placed in trays and heated in a vacuum oven at 150°C. for 1 hour and then at 210°C. for 3 hours. Analysis of the resultant product indicates a composition of 62 percent styrene; 23 percent maleic anhydride and 15 percent rubber (all percentages being percentages by weight). A portion of the polymer is examined under an electron microscope. Examination indicates that a large number of finely divided rubber gels containing at least 25 volume percent of styrene/maleic anhydride copolymer are occluded therein. The particles range in size from about 1/3 micron to about 1 micron in diameter. A plurality of test bars are prepared by injection molding the polymer and the physical properties are as follows:

Notched Izod impact — 2.55 foot pounds per inch of notch
Tensile strength at yield — 5887 pounds per square inch
Tensile at rupture — 5341 pounds per square inch
Elongation — 10.6 percent
Heat distortion temperature in accordance with ASTM Heat Distortion Test D648-56 of an annealed sample — 284°F.

EXAMPLE 2

The procedure of Example 1 is repeated with the exception that the block copolymer/diene rubber is replaced with a polybutadiene rubber having an inherent viscosity of 2.3. Examination of the product under an electron microscope indicates the rubber to be in the form of gels 3 to 5 microns in diameter and containing at least 25 volume percent styrene/maleic anhydride polymer and the physical properties of injection molded test bars indicates the following:

Notched Izod impact — 1.97 foot pounds per inch of notch
Tensile strength at yield — 3,180 pounds per square inch
Tensile strength at rupture — 3,770 pounds per square inch
Elongation — 20 percent
Heat distortion temperature — 295°F.

EXAMPLE 3

The procedure of Example 1 is repeated with the exception that the rubber employed is a styrene/butadiene block copolymer of the A-B configuration containing 30 percent by weight styrene and 70 percent by weight butadiene and having an inherent viscosity of 1.6. Examination of the polymer under an electron microscope indicates the largest rubber gels are about 3 microns in diameter and contain at least 25 percent occluded styrene/maleic anhydride therein, and the physical properties of the injection molded test specimens are as follows:

Notched Izod impact — 1.99 foot pounds per inch of notch
Tensile strength at yield — 6,689 pounds per square inch
Tensile strength at rupture — 6493 pounds per square inch
Elongation — 10.4 percent
Heat distortion temperature — 298°F.

EXAMPLE 4

A polymerization train is provided consisting of three stirred reactors connected in series. Each of the reactors has a recirculating pump which removes material from the bottom or discharge of the reactor and recirculates the material to the top or inlet of the reactor. The first reactor has a volume of about 3.2 liters and a pump in the recirculating line set to deliver 64 liters per hour; that is, recirculation at 20 times per hour. The first reactor has an agitator rotating at about 250 revolutions per minute and jacketed to maintain a temperature of about 74°C. The second reactor also has a volume of 3,2 liters, an agitator which rotates at 125 revolutions per minute and the recirculation pump is adjusted to deliver about 70.5 liters per hour; that is, recirculation at 22 times per hour. The third reactor has a capacity of about 6.4 liters and is agitated at 25 revolutions per minute. The recirculation pump delivers about 48 liters per hour or recirculates at about 7.5 times per hour. The discharge of the third reactor is passed to a continuous mechanical vacuum devolatilizer. A feed stream to the first reactor consists of 71.4 weight percent styrene; 16.8 weight percent of a block copolymer of 70 percent by weight butadiene, 30 percent styrene an inherent viscosity of 1.55; 11.6 weight percent methyl ethyl ketone. This stream is fed at a rate of 352.6 grams per hour. A second feed stream is fed to the first reactor. The second feed stream contains 89.7 percent methyl ethyl ketone; 10 percent maleic anhydride and 0.3 percent lauroyl peroxide. The second stream to the first reactor is fed at a rate of 40 grams per hour. The stream leaving the outlet of the first stage reactor to the inlet of the second reactor contains 18.8 percent solids and produces 14.57 grams per hour of polymer containing 27.45 percent maleic anhydride, representing conversion of about 5.7 percent of the monomer to polymer. The outlet stream of the first reactor is passed to the second reactor which is jacketed to maintain a temperature of about 83.3°C., and a third feed stream is fed to the second reactor. The third stream consists of 69.5 weight percent methyl ethyl ketone, 30 weight percent maleic anhydride and 0.5 weight percent lauroyl peroxide and is added at a rate of 122 grams per hour. At the discharge of the second reactor total solids level in the exciting stream is 48 percent and 64.23 percent of the monomer is converted to polymer. The discharge from the second reactor is passed to the third reactor which is jacketed to maintain a temperature of 118.5°C. The fourth feed stream is fed to the third reactor and consists of 72.75 percent methyl ethyl ketone; 25 percent maleic anhydride; 0.45 percent lauroyl peroxide; 0.9 percent 2,6-di-tert-butyl-p-cresol commercially available under the trade designation of "Ionol" and 0.9 percent trinonylphenylphosphite commercially available under the trade designation of "polygard." This stream is fed at a rate of 102.4 grams per hour. At the discharge from the third stream, the solids are 55.6 percent and the polymer obtained contains 26.65 percent maleic anhydride (based on the combined weight of the styrene and maleic anhydride). 89.26 percent of the monomer has been converted to polymer. Product from the third stage is passed to the mechanical devolatilizer operating at 250°C. and under an absolute pressure of 10 millimeters of mercury. The final devolatilized product as determined by material balance contains 19.3 percent maleic anhydride; 17.27 percent rubber; 0.27 percent Ionol and 0.27 percent Polygard, the remainder being styrene. The product from the devolatilizer is extruded as a continuous strand which is cooled and chopped into ⅛ inch long pellets. The pellets are subsequently injection molded into test specimens in a screw injection molding machine. Evaluation of the test specimens indicates the following:

Tensile strength at rupture — 6,200 pounds per square inch

Elongation to break — 11.4 percent
Tensile modulus — 356,000 pounds per square inch
Notched Izod impact — 2.38 foot pounds per inch of notch
Vicat softening point — 315°F. (ASTM D1525-65T Rate B)
Annealed deflection temperature — 306°F. Examination of the product under an electron microscope shows that the volumetric average particle size is about 0.5 micron, containing 45 percent glassy styrene maleic anhydride polymer as determined by subtracting the volume percentage of the rubber from the volume percentage of the observed gel particles, while the arithmetic particle size is 0.38 micron. The volume percentage of the observed particles is determined by photomicrographic analysis and the gel content is 31.7 percent.

EXAMPLE 5

The apparatus and general procedure of Example 4 are employed to make six different runs. The feed and temperatures are as follows:

Run 1

FIRST REACTOR MAIN FEED, fed at a rate of 328 grams per hour:
  71.4 weight percent styrene
  16.8 weight percent rubber as used in Example 4
  11.6 weight percent methyl ethyl ketone Agitated at 250 revolutions per minute; 75°C. polymerization temperature; recirculation rate of 10 times the vessel capacity per hour. SECOND FEED TO FIRST REACTOR, fed at a rate of 42.5 grams per hour:
  90 weight percent methyl ethyl ketone
  10.0 weight percent maleic anhydride
THIRD FEED TO SECOND REACTOR, fed at a rate of 106.5 grams per hour:
  69.7 weight percent methyl ethyl ketone
  30.0 weight percent maleic anhydride
  0.3 weight percent azo-bisisobutyronitrile
The second reactor is agitated at 100 revolutions per minute; 86°C. polymerization temperature; recirculation rate of 26 times the vessel capacity per hour.
FOURTH FEED TO THIRD REACTOR, fed at a rate of 126 grams per hour:
  68.8 weight percent methyl ketone
  30 weight percent maleic anhydride
  0.3 weight percent azo-bisisobutyronitrile
  0.45 weight percent Ionol
  0.45 percent by weight Polygard
The third reactor is agitated at 25 revolutions per minute; 101.5°C. polymerization temperature; recirculation rate of 8 times the vessel capacity per hour.

The solids content of the first, second and third stages is 17, 28 and 54 weight percent, respectively. After devolatilization, the polymer is analyzed and evaluated for physical properties which are set forth in Table I under Run 1.

Run 2

MAIN FEED TO FIRST STAGE, fed at a rate of 304 grams per hour:
  71.4 weight percent styrene
  16.8 weight percent rubber (as in Run 1)
  11 weight percent methyl ethyl ketone SECOND FEED TO FIRST STAGE, fed at a rate of 15.1 grams per hour:
89.9 weight percent methyl ethyl ketone
10 weight percent maleic anhydride
0.1 weight percent lauroyl peroxide The first reactor is agitated at a rate of 250 revolutions per minute; 72°C. polymerization temperature; recirculation rate of 10 times the vessel capacity per hour. THIRD FEED TO THE SECOND STAGE, fed at a rate of 101 grams per hour:
69.7 weight percent methyl ethyl ketone
30 weight percent maleic anhydride
0.3 weight percent azo-bisisobutyronitrile
Agitated at a rate of 100 revolutions per minute; 84.3°C. polymerization temperature; recirculation rate of 25 times the volume of the second reactor per hour. FOURTH FEED TO THE THIRD STAGE, fed at a rate of 123 grams per hour:
73.8 weight percent methyl ethyl ketone
25 weight percent maleic anhydride
0.3 weight percent azo-bisisobutyronitrile
0.45 weight percent Ionol
0.45 weight percent Polygard
Agitated at 25 revolutions per minute; 96°C. polymerization temperature; recirculate rate of 5 times the vessel volume per hour.

The resultant polymer is devolatilized in trays in a heated vacuum oven and the polymer analyzed and evaluated. The results are set forth in Table I under Run 2.

Run 3

MAIN FEED TO FIRST STAGE, fed at a rate of 296 grams per hour:
71.4 weight percent styrene
16.8 weight percent rubber (as in Run 1)
11.6 weight percent methyl ethyl ketone
SECOND FEED TO THE FIRST STAGE, fed at a rate of 26 grams per hour:
89.8 weight percent methyl ethyl ketone
10 weight percent maleic anhydride
0.2 weight percent lauroyl peroxide
The first reactor is agitated at 250 revolutions per minute; 71.3°C. polymerization temperature; recirculation rate is 10 times the volume of the vessel per hour. THIRD FEED TO THE SECOND STAGE, fed at a rate of 134.8 grams per hour:
69.5 weight percent methyl ethyl ketone
30 weight percent maleic anhydride
0.5 weight percent lauroyl peroxide
Agitated at 125 revolutions per minute; 83°C. polymerization temperature; recirculation rate of 20 times the volume of the vessel per hour. FOURTH FEED TO THE THIRD STAGE, fed at a rate of 108 grams per hour:
72.5 weight percent methyl ethyl ketone
25 weight percent maleic anhydride
0.45 weight percent lauroyl peroxide
0.9 weight percent Ionol
0.9 weight percent Polygard
The third reactor is agitated at 25 revolutions per minute; 95°C. polymerization temperature; recirculated at a rate of 5 times the volume of the vessel per hour.
The polymer is devolatilized in a vacuum oven and analyzed and evaluated for physical properties. The results are set forth in Table I under Run 3.

Run 4

MAIN FEED TO FIRST STAGE, fed at a rate of 291 grams per hour:
71.4 weight percent styrene
16.8 weight percent rubber (as in Run 1)
11.6 weight percent methyl ethyl ketone
SECOND FEED TO THE FIRST STAGE, fed at a rate of 23.6 grams per hour:
89.8 weight percent methyl ethyl ketone
10 weight percent methyl acrylate
0.2 weight percent lauroyl peroxide
The second reactor is agitated at 250 revolutions per minute; 71.3°C. polymerization temperature; recirculation rate is 10 times the volume of the vessel per hour.
THIRD FEED TO THE SECOND STAGE, fed at a rate of 143.5 grams per hour:
69.5 weight percent methyl ethyl ketone
30 weight percent methyl acrylate
0.5 weight percent lauroyl peroxide
The third reactor is agitated at 125 revolutions per minute; 83°C. polymerization temperature; recirculated at a rate of 20 times the volume of the vessel per hour.
FOURTH FEED TO THE THIRD STAGE, fed at a rate of 122 grams per hour:
72.5 weight percent methyl ethyl ketone
25 weight percent maleic anhydride
0.45 weight percent lauroyl peroxide
0.9 weight percent Ionol
0.9 weight percent Polygard
The third reactor is agitated at 25 revolutions per minute; 100°C. polymerization temperature; recirculated at a rate of 5 times the volume of the vessel per hour.
The reaction mixture is devolatilized in a vacuum oven, analyzed and the physical properties evaluated in the molded samples. The results are set forth in Table I under Run 4.

Run 5

A portion of the effluent from Run 4 is devolatilized by a continuous mechanical devolatilizer at a temperature of about 250°C., the polymer analyzed and the results which are obtained are set forth in Table I under Run 5.

Run 6

MAIN FEED TO THE FIRST STAGE, fed at a rate of 352 grams per hour:
71.4 weight percent styrene
16.8 weight percent rubber (as used in Run 1)
11.6 weight percent methyl ethyl ketone
SECOND FEED TO THE FIRST STAGE, fed at a rate of 31.6 grams per hour:
89.7 weight percent methyl ethyl ketone
10 weight percent maleic anhydride
0.3 weight percent lauroyl peroxide
The first reactor is agitated at 250 revolutions per minute; 74°C. polymerization temperature; recirculation rate of 20 times the volume of the vessel per hour.
THIRD FEED TO THE SECOND STAGE, fed at a rate of 119.5 grams per hour:
69.5 weight percent methyl ethyl ketone
30 weight percent maleic anhydride
0.5 weight percent lauroyl peroxide The second reactor is agitated at 125 revolutions per minute; 84°C. polymerization temperature; recirculation rate of 25 times the volume of the second vessel per hour.

FOURTH FEED TO THE THIRD STAGE, fed at a rate of 107.5 grams per hour:
72.75 weight percent methyl ethyl ketone
25 weight percent maleic anhydride
0.45 weight percent lauroyl peroxide
0.9 weight percent Ionol
0.9 weight percent Polygard The third reactor is agitated at 25 revolutions per minute; 118.5°C. polymerization temperature; recirculation rate is 7.5 times the capacity of the vessel per hour.

The polymer is analyzed and moldings evaluated. The results are set forth in Table I under Run 6.

cent Ionol in a Newberry screw injection molding machine and the physical properties determined as set forth in Table II which follows on Page 29.

TABLE II

| RUN | ULTIMATE TENSILE[1] | % ELONGATION | NOTCHED IZOD[2] | °F. DEFLECTION TEMPERATURE[3] | % IONOL FOUND[4] | TENSILE MODULUS |
|---|---|---|---|---|---|---|
| Control | 4900 | 14 | 3.8 | 270 | 0.07 | 292,000 |
| 0.5% Ionol added to copolymer | 5000 | 12 | 3.9 | 268 | 0.46 | 297,000 |
| 1% Ionol added to copolymer | 4800 | 10 | 4.0 | 268.5 | 0.89 | 281,000 |

[1] = pounds per square inch
[2] = foot pounds per inch
[3] = annealed (ASTM Test P648-56)
[4] = as determined by vapor phase chromatography Employing most styrene-type impact resins, the increase in the level of the stabilizer could reasonably be expected to reduce the deflection temperature by a substantially greater degree.

EXAMPLE 7

The copolymer of Example 1 is injection molded to form a plurality of bars. Several of the sample bars are exposed for one second to a 5 percent solution of ethylene diamine in ethanol; a second group of samples are exposed to the solution for 10 seconds and a third group of sample bars are exposed for 5 minutes to ethylenediamine vapor. The samples are subsequently sprayed with methyl ethyl ketone, commercial standard

TABLE I

| RUN NO. | % MALEIC ANHYDRIDE IN RIGID PHASE | % RUBBER | TENSILE STRENGTH AT YIELD[1] | TENSILE STRENGTH AT RUPTURE[1] | % ELONGATION AT YIELD | % ELONGATION AT RUPTURE |
|---|---|---|---|---|---|---|
| 1 | 27.5 | 17 | 4700 | 4800 | — | 9.5 |
| 2 | 23.8 | 16.3 | 4500 | 4600 | — | 13.3 |
| 3 | 27.4 | 16.8 | 6150 | 6230 | 3 | 6.7 |
| 4 | 28.4 | 15.4 | 6200 | 6400 | 3 | 16 |
| 5 | 28.4 | 15.4 | 6700 | 7000 | 3.1 | 13 |
| 6 | 23.4 | 17.4 | 6100 | 6150 | 2.8 | 12.5 |

| RUN NO. | FLEXURAL MODULUS[1] | IZOD IMPACT STRENGTH[2] | VICAT HEAT SOFTENING TEMPERATURE-°F. | DEFLECTION TEMPERATURE-°F. | ARITHMETIC AVERAGE PARTICLE SIZE (micron) | VOLUME % OF RUBBER PARTICLES |
|---|---|---|---|---|---|---|
| 1 | — | 1.56 | 316 | 300 | 1.09 | 27.6 |
| 2 | 267,000 | 1.82 | 301 | 285 | 0.83 | 40.8 |
| 3 | 354,000 | 2.50 | 326 | 307 | 0.33 | 25.9 |
| 4 | 371,000 | 2.40 | 325 | 311 | 0.59 | 27.1 |
| 5 | 385,000 | 1.7 | 330 | 315 | 0.32 | 30.1 |
| 6 | 354,000 | 2.39 | 313 | 307 | 0.29 | 29.1 |

[1] = pounds per square inch
[2] = notched; foot pounds per inch of notch

EXAMPLE 6

Employing the procedure of Example 4, a rubber modified styrene/maleic anhydride copolymer is produced having 23.3 percent styrene; 19.2 percent maleic anhydride and trace amounts of Ionol and Polygard. Samples of this material are blended with 0.5 and 1 percent Ionol in a Newberry screw injection molding machine and the physical properties determined as set forth in Table II which follows on Page 29.

automobile primer and a commercially available shoe heel lacquer. As can be seen in Table III which follows on page 31, glossy surfaces are obtained when one percent ethylenediamine is added to the methyl ethyl ketone, to the automobile primer and to the heel enamel.

TABLE III

| SPRAY EXPOSURE | CONTROL | 5% ETHYLENEDIAMINE (EDA), 95% ETHANOL[2] | EDA VAPOR[3] | 1% EDA ADDED TO SPRAY SOLUTION |
|---|---|---|---|---|
| Methyl Ethyl Ketone | rough | smooth | glossy | glossy | glossy |

TABLE III-continued

| SPRAY EXPOSURE | CONTROL | 5% ETHYLENEDIAMINE (EDA)₁ 95% ETHANOL₂ | EDA VAPOR₃ | 1% EDA ADDED TO SPRAY SOLUTION |
|---|---|---|---|---|
| Auto Primer | rough | smooth | glossy | glossy |
| Heel Enamel | rough | smooth | glossy | glossy |

₁ = 1 second
₂ = 10 seconds
₃ = 5 minutes

EXAMPLE 8

The procedure of Example 1 is repeated with the exception that the rubber is replaced with other rubbers and the results are set forth in Table IV which follows on Page 33.

TABLE IV

| SAMPLE NO. | COMPOSITION (%) STYRENE | MALEIC ANHYDRIDE | RUBBER | RUBBER TYPE | MOLECULAR WEIGHT | NOTCHED IZOD IMPACT₁ | TENSILE AT BREAK₂ | DEFLECTION TEMPERATURE₃ |
|---|---|---|---|---|---|---|---|---|
| 1 | 62.9 | 22.3 | 14.8 | polybutadiene - inherent viscosity 2.04 | medium | 1.60 | 4200 | 293 |
| 2 | 63.5 | 21.6 | 14.9 | polybutadiene - inherent viscosity 2.3 | high | 1.97 | 3770 | 295 |
| 3 | 63.2 | 22.9 | 14.9 | random copolymer of 70% butadiene; 30% styrene | medium | 1.7 | 4300 | 296 |
| 4 | 61.5 | 24.0 | 14.5 | 70/30 butadiene/styrene block copolymer; inherent viscosity 1.55 | low | 1.98 | 6400 | 302 |

₁ = foot pounds per inch
₂ = pounds per square inch
₃ = °F.

In a manner similar to the foregoing examples, other impact resistant polymers are readily prepared from the alkenyl aromatic monomers and unsaturated dicarboxylic anhydrides hereinbefore set forth.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A polymer suitable for molding and extrusion, of substantially improved resistance to mechanical shock and impact, the polymer consisting essentially of the polymerization product of
   a. a monovinyl alkenyl aromatic monomer containing up to 12 carbon atoms and having the alkenyl group attached directly to the benzene nucleus, the alkenyl aromatic compound being present in a proportion of from about 65 to 95 parts by weight and from 35 to 5 parts by weight of an unsaturated dicarboxylic acid anhydride readily copolymerizable therewith, and
   b. from 5 to 35 parts by weight of a diene rubber per 100 parts of (a) plus (b), the rubber consisting essentially of 65 to 100 weight percent butadiene, or isoprene and up to 35 weight percent of an alkenyl aromatic hydrocarbon, the rubber having a glass temperature not higher than 0°C., the rubber being in the form of a plurality of particles having diameters within the range of 0.02 to 30 microns dispersed throughout a matrix of polymer of alkenyl aromatic monomer and the anhydride, at least a major portion of the rubber particles containing distinct occlusions of the polymer of (a), with the further limitation that
   the polymer of (a) is a nonequimolar random copolymer.

2. The polymer of claim 1 wherein the monovinyl monomer is styrene.

3. The polymer of claim 1 wherein the unsaturated dicarboxylic acid anhydride is maleic anhydride.

4. The polymer of claim 1 wherein the particles have diameters of from about 0.1 to about 10 microns.

5. The polymer of claim 1 wherein the rubber is a polybutadiene rubber.

6. The polymer of claim 1 wherein the rubber is a block copolymer of butadiene and styrene.

7. The polymer of claim 1 wherein the rubber is present in a proportion of from about 10 to about 25 parts by weight.

8. The polymer of claim 1 in the form of a molded article.

9. The polymer of claim 1 wherein the rubber has an inherent viscosity of 0.9 to 1.7 grams per deciliter.

10. A polymer suitable for molding and extrusion having substantially improved resistance to mechanical shock of impact, the polymer consisting essentially of the polymerization product of (a) 65 to 95 parts by weight of styrene, 35 to 5 parts by weight of maleic anhydride, (b) from 5 to 35 parts by weight of a diene rubber, the rubber being in the form of a plurality of particles having diameters within the range of from about 0.02 to about 30 microns, at least a major portion of the rubber particles containing distinct occlusions of the polymer (a).

11. A method for the preparation of an impact resistant polymer of an alkenyl aromatic monomer and an unsaturated dicarboxylic acid anhydride copolymerizable therewith, the polymer being suitable for molding and extrusion, the steps of the method comprising providing a solution consisting essentially of an alkenyl aromatic monomer having dissolved therein a rubber, agitating the monomer/rubber mixture and initiating free radical polymerization thereof, adding to the agitated mixture the unsaturated anhydride at a rate substantially less than the rate of polymerization of the alkenyl aromatic resinous monomer to form a nonequimolar random copolymer of monomer and anhydride, and polymerizing the alkenyl aromatic monomer and the unsaturated anhydride, the alkenyl aromatic monomer being employed in a proportion of from about 65 to 95 parts by weight, the unsaturated anhydride from about 35 to 5 parts by weight and the rubber consisting essentially of 65 to 100 weight percent butadiene, or isoprene and up to 35 weight percent of an alkenyl aromatic hydrocarbon, the rubber being present in a proportion of from about 5 to 35 parts per 100 parts, of the combined weight of the alkenyl aromatic monomer and the anhydride, thereby providing a polymer having the rubber in the form of a plurality of particles having diameters within the range of 0.02 to 30 microns dispersed throughout the matrix, the random copolymer and a major portion of the particles containing distinct occlusions of the random copolymer.

12. The method of claim 11 wherein the alkenyl aromatic monomer is styrene.

13. The method of claim 11 wherein the unsaturated acid anhydride is maleic anhydride.

14. The method of claim 11 wherein the rubber is a polybutadiene rubber.

15. The method of claim 11 wherein the rubber is the block copolymer of butadiene and styrene.

16. The method of claim 11 including a solvent being non-reactive under polymerization conditions, the solvent being a solvent for the monomer, polymer and rubber.

17. The method of claim 16 wherein the solvent is methyl ethyl ketone.

18. The method of claim 16 including the step of removing the solvent after polymerization.

19. The method of claim 11 wherein polymerization is initiated with a free radical generating initiator.

20. A method for the preparation of an impact resistance polymer of styrene and maleic anhydride, the polymer being suitable for molding and extrusion, the steps of the method comprising providing a solution consisting essentially of an alkenyl aromatic monomer and a diene rubber having a glass temperature not higher than 0°C., the rubber consisting essentially of 65 to 100 weight percent butadiene, or isoprene and up to 35 weight percent of an alkenyl aromatic hydrocarbon, agitating the styrene/rubber mixture and initiating free radical polymerization, adding the maleic anhydride to the agitated mixture at a rate substantially less than the rate of polymerization of the styrene, polymerizing the styrene and maleic anhydride, the styrene being employed in a proportion of from about 65 to 95 parts by weight, the anhydride from about 35 to 5 parts by weight and the rubber from about 5 to 35 parts by weight per 100 parts of the combined weight of the styrene and maleic anhydride, with the further limitation that the polymer of the styrene and maleic anhydride forms a nonequimolar random copolymer.

21. The polymer of claim 1 wherein the unsaturated dicarboxylic acid anhydride is maleic anhydride, chloromaleic anhydride, dichloromaleic anhydride, citraconic anhydride, itaconic anhydride, phenylmaleic anhydride, aconitic anhydride and mixtures thereof.

22. The method of claim 11 wherein the unsaturated dicarboxylic acid anhydride is maleic anhydride, chloromaleic anhydride, dichloromaleic anhydride, citraconic anhydride, itaconic anhydride, phenylmaleic anhydride, aconitic anhydride and mixtures thereof.

* * * * *

REEXAMINATION CERTIFICATE (886th)

United States Patent [19]

Moore et al.

[11] B1 3,919,354

[45] Certificate Issued Jul. 5, 1988

[54] IMPACT RESISTANT POLYMERS OF A RESINOUS COPOLYMER OF AN ALKENYL AROMATIC MONOMER AND UNSATURATED DICARBOXYLIC ANHYDRIDE

[75] Inventors: Eugene R. Moore; Ronald G. Lehrer; Charles E. Lyons; Leland D. McKeever, all of Midland, Mich.

[73] Assignee: The Dow Chemical Company, Midland, Mich.

Reexamination Request:
No. 90/000,524, Mar. 5, 1984
No. 90/000,608, Aug. 13, 1984

Reexamination Certificate for:
Patent No.: 3,919,354
Issued: Nov. 11, 1975
Appl. No.: 471,087
Filed: May 17, 1974

Related U.S. Application Data

[63] Continuation of Ser. No. 287,526, Sep. 8, 1972, abandoned, which is a continuation-in-part of Ser. No. 182,893, Sep. 22, 1971, abandoned.

[51] Int. Cl.$^4$ .......................................... C08F 279/02
[52] U.S. Cl. ........................................ 525/257; 525/244; 525/245; 525/255; 525/259; 525/261; 525/279; 525/285; 525/941
[58] Field of Search ........................................ 525/257

[56] References Cited

U.S. PATENT DOCUMENTS

| | | | |
|---|---|---|---|
| 2,275,951 | 3/1942 | Farmer | 260/768 |
| 2,694,692 | 11/1954 | Amos et al. | 260/45.5 |
| 2,769,804 | 11/1956 | Hanson | 260/86.7 |
| 2,903,440 | 9/1959 | Heiligmann | 260/88.1 |
| 2,914,505 | 11/1959 | Roper et al. | 260/45.5 |
| 2,971,939 | 2/1961 | Baer | 260/45.5 |
| 2,989,517 | 6/1961 | Hanson et al. | 260/93.5 |
| 3,322,853 | 5/1967 | Trementozzi et al. | 260/837 |
| 3,336,267 | 8/1967 | Zimmerman et al. | 260/78.5 |
| 3,642,949 | 3/1969 | Stafford et al. | 260/876 |
| 3,651,171 | 3/1972 | Von Bonin et al. | 260/857 |
| 3,708,555 | 1/1973 | Gaylord | 260/878 |
| 3,714,295 | 1/1973 | Nakayamo | 260/879 |
| 3,721,724 | 3/1973 | Uebele | 260/880 |
| 3,751,524 | 8/1973 | Haigh et al. | 260/878 |

FOREIGN PATENT DOCUMENTS

| | | |
|---|---|---|
| 820154 | of 0000 | United Kingdom . |
| 1088383 | of 0000 | United Kingdom . |
| 820159 | 9/1959 | United Kingdom . |
| 1315219 | 5/1973 | United Kingdom . |

OTHER PUBLICATIONS

Bacon and Farmer, "The Interaction of Maleic Anhydride with Rubber", Proceedings of the Rubber Technology Conference, May 1938.

Keskkula et al., "Dynamic Mechanical Characterization of Gel Phase in High Impact Polystyrene", Polymer Letters, vol. 7, pp. 697–703 (1969).

Keskkula, "Rubber Modified Styrene Polymers", Applied Polymer Symposium, No. 15, pp. 51–58 (1970).

Hanson and Zimmerman, "Continuous Recycle Polymerization", vol. 49, No. 11, Industrial and Engineering Chemistry, pp. 1803–1806 (1957).

Molau et al., "Heterogeneous Polymer Systems. IV: Mechanism of Rubber-Modified Vinyl Polymers", Journal of Polymer Science: Part A-1, vol. 4, pp. 1595–1607 (1966).

Turley, "Effects of Polymer Structure on Impact Properties", No. 7, Applied Polymer Symposia, pp. 237–252 (1968).

Molau and Keskkula, Journal of Applied Polymer Symposia, No. 7, pp. 35–40, 1968.

"Toughening Thermoplastic Resins with Rubber", British Plastics 32, 549–556 (1959).

Molau et al, "Mechanism of Rubber Particle Formation***", Journal of Polymer Science, 4, 1595–1607 (1966).

*Primary Examiner*—Paul R. Michl

[57] ABSTRACT

Impact resistant polymers of sytrene/maleic anhydride and similar monomers are prepared by providing a solution of rubber in styrene, initiating polymerization and adding maleic anhydride.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 10–22 are cancelled.

Claims 2–9 are determined to be patentable as amended.

New claims 23–28 are added and determined to be patentable.

2. The polymer of claim [1] *28* wherein the monovinyl monomer is styrene.

3. The polymer of claim [1] *28* wherein the unsaturated dicarboxylic acid anhydride is maleic anhydride.

4. The polymer of claim [1] *28* wherein the particles have diameters of from about 0.1 to about 10 microns.

5. The polymer of claim [1] *28* wherein the rubber is a polybutadiene rubber.

6. The polymer of claim [1] *28* wherein the rubber is a block copolymer of butadiene and styrene.

7. The polymer of claim [1] *28* wherein the rubber is present in a proportion of from about 10 to about 25 parts by weight.

8. The polymer of claim [1] *28* in the form of a molded article.

9. The polymer of claim [1] *28* wherein the rubber has an inherent viscosity of 0.9 to 1.7 grams per deciliter.

*23. The polymer of claim 6 wherein the unsaturated dicarboxylic acid anhydride is maleic anhydride and the alkenyl aromatic compound is styrene.*

*24. The polymer of claim 23 wherein the resistance to mechanical shock of the polymer is improved over that of a blend of the styrene maleic anhydride copolymer and the rubber.*

*25. The polymer of claim 24 in which the impact strength is from about 1.56 to about 4.0 foot pounds per inch of notch.*

*26. The polymer of claim 24 in which the heat resistance is not decreased from that of polymer (a) alone.*

*27. The polymer of claim 26 in which the impact strength is from about 1.56 to about 4.0 foot pounds per inch of notch.*

*28. A polymer suitable for molding and extrusion, of substantially improved resistance to mechanical shock and impact, the polymer consisting essentially of the polymerization product of*

*a. a monovinyl alkenyl aromatic monomer containing up to 12 carbon atoms and having the alkenyl group attached directly to the benzene nucleus, the alkenyl aromatic compound being present in a proportion of from about 65 to 95 parts by weight and from 35 to 5 parts by weight of an unsaturated dicarboxylic acid anhydride readily copolymerizable therewith, and*

*b. from 5 to 35 parts by weight of a diene rubber per 100 parts of (a) plus (b), the rubber consisting essentially of 65 to 100 weight percent butadiene, or isoprene and up to 35 weight percent of an alkenyl aromatic hydrocarbon as the sole other monomer in the rubber, the rubber having a glass temperature not higher than 0° C., the rubber being in the form of a plurality of particles having diameters within the range of 0.02 to 30 microns dispersed throughout a matrix of polymer of alkenyl aromatic monomer and the anhydride, at least a major portion of the rubber particles containing distinct occulusions of the polymer of (a), with the further limitation that*

*the polymer of (a) is a nonequimolar random copolymer.*

* * * * *